J. L. BOGERT.
FASTENING.
APPLICATION FILED MAY 8, 1917. RENEWED JUNE 30, 1919.
Patented Nov. 18, 1919.
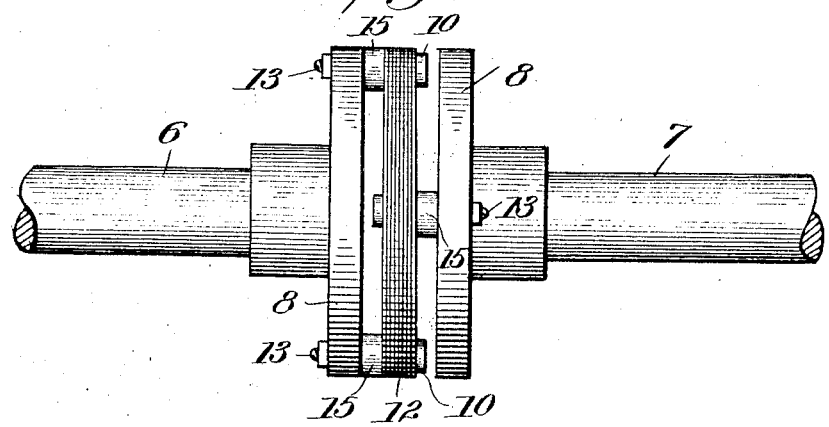
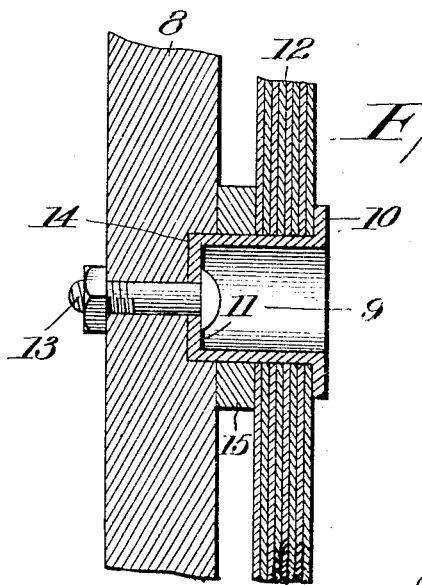

UNITED STATES PATENT OFFICE.

JOHN LAWRENCE BOGERT, OF NEW YORK, N. Y., ASSIGNOR TO EDWIN H. LUDEMAN, OF NEW YORK, N. Y.

FASTENING.

1,322,087.  Specification of Letters Patent.  Patented Nov. 18, 1919.

Application filed May 8, 1917, Serial No. 167,281. Renewed June 30, 1919. Serial No. 307,779.

*To all whom it may concern:*

Be it known that I, JOHN L. BOGERT, a citizen of the United States, residing at New York city, in the county of New York and State of New York, have invented certain new and useful Improvements in Fastenings, of which the following is a specification.

This invention relates to connecting or fastening devices especially suitable or adapted for attaching two parts which are subjected to twisting strain. It is intended especially for use in connection with flexible shaft couplings, which may be of that type using a flexible or laminated ring which sustains in one direction the torque between coupling members, and which will bend or flex in other directions to permit angular variation of the shaft sections connected by the coupling. Such a coupling is shown for example in the application of Edwin H. Ludeman Serial No. 146,936 for flexible shaft coupling.

The laminated rings employed in this type of couplings have heretofore been connected to the coupling members by means of bolts, by studs on the members, and in various other ways. These fastening devices are subjected to a shearing action due to the power transmitted in the rotation of the shaft.

The object of the present invention is to provide an improved device for connecting such rings, for example, to the associated members.

In the accompanying drawings Figure 1 is a side elevation of a coupling employing the invention. Fig. 2 is a detail in section of the device.

Referring specifically to the drawings, 6 and 7 indicate shaft sections with a flexible coupling between, comprising in this example heads 8 fastened to the shafts, and a laminated ring between the heads, and connected alternately thereto, as described in said application. Reference may also be made to the patent to Thomas No. 1,188,113, showing a coupling employing flexible rings.

For attaching the rings 12 to the heads and to an intermediate member if one is employed, I provide a thimble 9, consisting of a hollow barrel with an outstanding flange 10 at one end and a closed inner end 11 having a hole for a bolt or the like 13. The inner end of this thimble fits or is seated in a corresponding recess or cavity 14 in the adjacent rigid member 8, to which it is fastened by the bolt 13. The laminations of the ring 12 have holes through which the thimble extends, and a washer 15 may be interposed to space the ring from the adjacent parts.

By seating the inner end of the thimble in the body of the member or head the shearing strain is taken by the same, instead of by the attaching bolt, and the flange 10 at the end serves to confine the ring to the thimble without any additional attaching device. This provides a connecting or fastening device which is very effective for the purpose stated and more satisfactory than the fastening devices commonly employed. The thimble can be made of pressed steel and the attaching bolt of inferior stock.

I claim:

1. In a flexible coupling, the combination with a head and a flexible ring spaced therefrom, of a thimble fitting through the flexible ring and into a recess in the head, and abutting at its sides against the side wall of the recess, and means to secure the inner end of said thimble in said recess.

2. In a flexible coupling, the combination with opposite rotary heads having recesses in the adjacent faces thereof, and a flexible ring located between and spaced from said heads, of thimbles extending through said ring and fitting in the recess of the opposite heads alternately, and means to fasten the thimbles in the recesses.

In testimony whereof, I affix my signature in presence of two witnesses.

JOHN LAWRENCE BOGERT.

Witnesses:
MARIE A. RITTER,
IDA DALCHER.